United States Patent
Crowder (10) Patent No.: US 11,736,344 B2
(45) Date of Patent: *Aug. 22, 2023

(54) CONTAINING A FAULTY STIMULUS IN A CONTENT DELIVERY NETWORK

(71) Applicant: Level 3 Communications, LLC, Broomfield, CO (US)

(72) Inventor: William Crowder, Camarillo, CA (US)

(73) Assignee: Level 3 Communications, LLC, Broomfield, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/707,086

(22) Filed: Mar. 29, 2022

(65) Prior Publication Data

US 2022/0224597 A1 Jul. 14, 2022

Related U.S. Application Data

(63) Continuation of application No. 16/921,825, filed on Jul. 6, 2020, now Pat. No. 11,296,928.

(Continued)

(51) Int. Cl.
*G06F 15/173* (2006.01)
*H04L 41/0695* (2022.01)
*H04L 41/069* (2022.01)
*H04L 67/12* (2022.01)
*H04L 69/40* (2022.01)
*G06F 15/16* (2006.01)

(52) U.S. Cl.
CPC ........ *H04L 41/0695* (2013.01); *H04L 41/069* (2013.01); *H04L 67/12* (2013.01); *H04L 69/40* (2013.01)

(58) Field of Classification Search
CPC ... H04L 41/0695; H04L 41/069; H04L 67/12; H04L 69/40; H04L 41/0672; H04L 63/1441; H04L 67/1097
USPC ................................................ 709/224, 231
See application file for complete search history.

(56) References Cited

U.S. PATENT DOCUMENTS 6,675,295 B1 * 1/2004 Marcelais ........... G06F 11/1441
726/16
9,215,248 B1 12/2015 Bergman
(Continued)

OTHER PUBLICATIONS

Canadian Examination Report, dated Nov. 16, 2022, Application No. 3,168,520, filed Jul. 6, 2020; 4 pgs.
(Continued)

*Primary Examiner* — Karen C Tang (57) ABSTRACT

Examples described herein relate to systems and methods for containing a faulty stimulus. A computer-implemented method may include listing in a suspect list every received stimulus including the faulty stimulus, and implicitly testing the stimuli by respectively acting upon those stimuli by a software application. Responsive to successfully acting upon each of the stimuli besides the faulty stimulus, each non-faulty stimulus is deleted from the suspect list and, responsive to such deletion, made available to a downstream node. Responsive to acting upon the faulty stimulus, the software application crashes which leaves the faulty stimulus listed in the suspect list. The software application then restarts and deems the faulty stimulus as being faulty based upon the faulty stimulus still being listed in the suspect list after the restart.

18 Claims, 4 Drawing Sheets

Related U.S. Application Data (60) Provisional application No. 62/984,745, filed on Mar. 3, 2020.

(56) References Cited

U.S. PATENT DOCUMENTS

| | | |
|---|---|---|
| 9,916,233 B1 | 3/2018 | Qureshi |
| 10,318,285 B1 | 6/2019 | Jodoin |
| 10,528,427 B1* | 1/2020 | Kataki ................ G06F 11/1438 |
| 2004/0003266 A1 | 1/2004 | Moshir |
| 2008/0201705 A1 | 8/2008 | Wookey |
| 2013/0159472 A1 | 6/2013 | Newton et al. |
| 2015/0040231 A1 | 2/2015 | Oliphant |
| 2015/0040232 A1 | 2/2015 | Oliphant |
| 2016/0004820 A1* | 1/2016 | Moore ................... G16H 15/00 705/3 |
| 2017/0329289 A1 | 11/2017 | Kohn |
| 2018/0173510 A1* | 6/2018 | Koshkin .......... G06Q 10/06313 |
| 2019/0036883 A1 | 1/2019 | Bergman |
| 2019/0278928 A1 | 9/2019 | Rungta |
| 2020/0104250 A1 | 4/2020 | Patel |
| 2020/0110905 A1* | 4/2020 | O'Cleirigh .............. G06F 21/51 |
| 2020/0249928 A1 | 8/2020 | Zeng |
| 2021/0026750 A1 | 1/2021 | Shukla |
| 2021/0073026 A1* | 3/2021 | Myers ................. G06F 11/3065 |
| 2021/0281472 A1 | 9/2021 | Crowder |

OTHER PUBLICATIONS

International Search Report and Written Opinion of the International Searching Authority, dated Oct. 19, 2020, Int'l Appl. No. PCT/US20/040935, Int'l Filing Date Jul. 6, 2020; 10 pgs.

International Preliminary Report on Patentability, dated Sep. 15, 2022, Int'l Appl. No. PCT/US20/040935, Int'l Filing Date Jul. 6, 2020; 8 pgs.

* cited by examiner

CONTAINING A FAULTY STIMULUS IN A CONTENT DELIVERY NETWORK

BACKGROUND

A content delivery network (CDN) includes a geographically distributed network of servers configured for facilitating distribution of content items (e.g., videos, images, website content data, and so on) from an origin server to clients that consume the content items. Each server in the CDN can be referred to as a node, a machine, a computer, and so on. To distribute the content items to clients that are geographically remote to the origin server, a node in geographical proximity to the clients can provide the content items to those clients on behalf of the origin server. Additional components in the CDN can participate in or control the distribution of content items to clients. For example, the CDN can include a control core that controls nodes in the CDN, e.g., transmits stimuli such as commands for nodes to take. Nodes that receive stimuli from the control core can distribute those stimuli to other nodes in the CDN. Accordingly, if a stimulus is faulty, it can be distributed to and acted upon by multiple nodes in the CDN, which may cause the nodes' respective software applications acting upon that stimulus to crash. Furthermore, upon restarting the respective software applications, the nodes may again act upon the stimulus resulting in another crash, potentially resulting in a crash loop that can detrimentally affect performance of the CDN, e.g., by disrupting distribution of content items to clients via those nodes.

BRIEF SUMMARY

Provided herein are systems and methods for containing a faulty stimulus in a content delivery network (CDN).

A computer-implemented method for containing a faulty stimulus is provided herein. The method includes adding to a suspect list every stimulus in a received plurality of stimuli including non-faulty stimuli and the faulty stimulus. The method includes implicitly testing the stimuli by respectively acting upon those stimuli by a software application. The method includes, responsive to successfully acting upon each of the non-faulty stimuli by the software application, deleting that non-faulty stimulus from the suspect list; and responsive to the deleting, making that non-faulty stimulus available to a downstream node. The method includes, responsive to a crash of the software application caused by acting upon the faulty stimulus, restarting the software application subsequent to the crashing; and deeming the faulty stimulus as being faulty based upon it still being listed in the suspect list after the restarting.

In some examples, the method further includes reporting the deemed faulty stimulus to an upstream computer.

In some examples, the computer does not act again upon the faulty stimulus based upon the faulty stimulus being deemed faulty.

In some examples, the computer makes the faulty stimulus unavailable to the downstream node based upon the faulty stimulus being deemed faulty.

In some examples, the crash also leaves a non-faulty stimulus listed in the suspect list, and that non-faulty stimulus is deemed as being faulty based upon it still being in listed in the suspect list after the restarting.

In some examples, stimuli of the plurality of stimuli independently include commands for the downstream node to take an action or to change configuration.

In some examples, the storage device includes a mass storage device.

A computer system that includes a processor, a storage device, and a network interface is provided herein. The processor is configured to implement operations that include adding to a suspect list stored in the storage device, by the processor, every stimulus in a received plurality of stimuli including non-faulty stimuli and the faulty stimulus. The operations also include implicitly testing, by a software application running on the processor, the stimuli by respectively acting upon those stimuli. The operations also include, responsive to successfully acting upon each of the non-faulty stimuli, deleting, by the processor, that non-faulty stimulus from the suspect list; and responsive to the deleting, making available, by the processor via the network interface, that non-faulty stimulus to a downstream node. The operations also include, responsive to a crash of the software application caused by acting upon the faulty stimulus, restarting the software application subsequent to the crashing; and deeming, by the processor, the faulty stimulus as being faulty based upon it still being listed in the suspect list after the restarting.

In some examples, the processor further is configured to report the deemed faulty stimulus to an upstream computer.

In some examples, the processor further is configured not to act again upon the faulty stimulus based upon the faulty stimulus being deemed faulty.

In some examples, the processor further is configured to make the faulty stimulus unavailable to the downstream node based upon the faulty stimulus being deemed faulty.

In some examples, the crashing also leaves a non-faulty stimulus listed in the suspect list, and the processor further is configured to deem that non-faulty stimulus as being faulty based upon it still being in listed in the suspect list after the restarting.

In some examples, stimuli of the plurality of stimuli independently include commands for a downstream node to take an action or to change configuration.

In some examples, the storage device includes a mass storage device.

Another computer-implemented method for containing a faulty stimulus is provided herein. The method includes implicitly testing a received plurality of stimuli, including non-faulty stimuli and the faulty stimulus, by respectively acting upon those stimuli by a software application. The method includes, responsive to successfully acting upon the non-faulty stimuli, making those non-faulty stimuli unavailable to a plurality of downstream nodes. The method includes, responsive to a crash of the software application caused by acting upon the faulty stimulus, making the faulty stimulus unavailable to the plurality of downstream nodes.

In some examples, each of the downstream nodes also is configured to implement the method.

In some examples, at least one of the downstream nodes has a different software application version than does the computer.

Another computer system that includes a processor and a network interface is provided herein. The processor is configured to implement operations that include implicitly testing, by the processor, a received plurality of stimuli, including non-faulty stimuli and the faulty stimuli, by respectively acting upon the stimuli by a software application. The operations include, responsive to successfully acting upon the non-faulty stimuli, making available, by the processor via the network interface, those stimuli to the plurality of downstream nodes. The operations include, responsive to a crash of the software application caused by acting upon the faulty stimulus, making the faulty stimulus unavailable to the plurality of downstream nodes.

In some examples, each of the downstream nodes also is configured to implement the operations.

In some examples, at least one of the downstream nodes uses a different software application version than does the processor.

These and other features, together with the organization and manner of operation thereof, will become apparent from the following detailed description when taken in conjunction with the accompanying drawings.

DETAILED DESCRIPTION

Embodiments described herein relate to containing a faulty stimulus in a content delivery network (CDN). However, it should be appreciated that the present systems and methods may be implemented in any suitable computing environment and are not limited to CDNs.

In a CDN, which also may be referred to as a content delivery system, an edge node is a node that initially receives a request for one or more content items from a client. The client refers to a device operated by an end user who desires to consume or otherwise receive one or more of the content items provided by the origin server. The content item is or includes a portion, a segment, an object, a file, or a slice of data stored by the origin server and cached at various nodes throughout the CDN for provisioning to one or more of the clients, e.g., via one or more edge nodes. The origin server refers to a device operated by a customer of the CDN, which facilitates the customer in delivering the content items to respective clients. A control core may control the nodes in the CDN, e.g., may distribute stimuli to such nodes that independently include commands for the nodes to take action(s) or to change configuration(s).

The control core of a CDN does not act upon the stimuli that it distributes, and as such may distribute a faulty stimulus without having reason to know that such stimulus is faulty, unless and until a software application on a node crashes as a result of acting upon the faulty stimulus and a system operator eventually identifies the source of the crash. Similarly, unless the nodes that receive such faulty stimulus have advanced reason to know it is faulty, those nodes may further distribute the faulty stimulus to one or more downstream nodes (e.g., an edge node), which may cause software applications running on those CDN components to crash. As provided herein, nodes that receive stimuli (whether directly from the control core, or indirectly from another node) implicitly test each stimulus by acting upon that stimulus to determine whether it is faulty before distributing it to any other downstream nodes. If the command is faulty, then the software application of the node that is executing that command will crash. That is, as used herein, a "faulty" stimulus is a stimulus that causes a software application of a node to crash when acting upon that stimulus. By "crash" it is meant that the software application being executed by the node stops working normally. A crash may include an operating system crash. Note that a faulty stimulus may itself be innocent, but may expose a bug in the software application. As such, within the framework of the application the stimulus may be legal, but nevertheless may expose a bug during processing. Such processing may include normal processing, or the taking of unusual code paths in response to abnormal processing.

As provided herein, the fact of the node's crash can be used to contain the software application from further distributing the faulty stimulus within the CDN, and can permit other nodes within the CDN to continue functioning normally. For example, in a manner such as described with reference to FIGS. 1-2, as a result of the crash, the faulty stimulus may remain in a suspect list that is stored at the node, and the fact of its presence in the suspect list upon restart of the software application inhibits its further execution or distribution. Additionally, or alternatively, in a manner such as described with reference to FIGS. 3-4, as a result of the crash, the crashed node may block distribution of the faulty stimulus to downstream nodes while those nodes continue to function normally. Conversely, if the software application of the node did not crash as a result of acting upon the stimulus, then the fact of the node's software applications' survival indicates that the stimulus is not faulty, at least with regards to the software application being executed by that node, and the stimulus then may be distributed to one or more other nodes within the CDN. It should be appreciated that configurations such as described with reference to FIGS. 1-2 optionally may be, but need not necessarily be, implemented in configurations such as described with reference to FIGS. 3-4. Similarly, it should be appreciated that configurations such as described with reference to FIGS. 3-4 optionally may be, but need not necessarily be, implemented in configurations such as described with reference to FIGS. 1-2.

Figure 1:
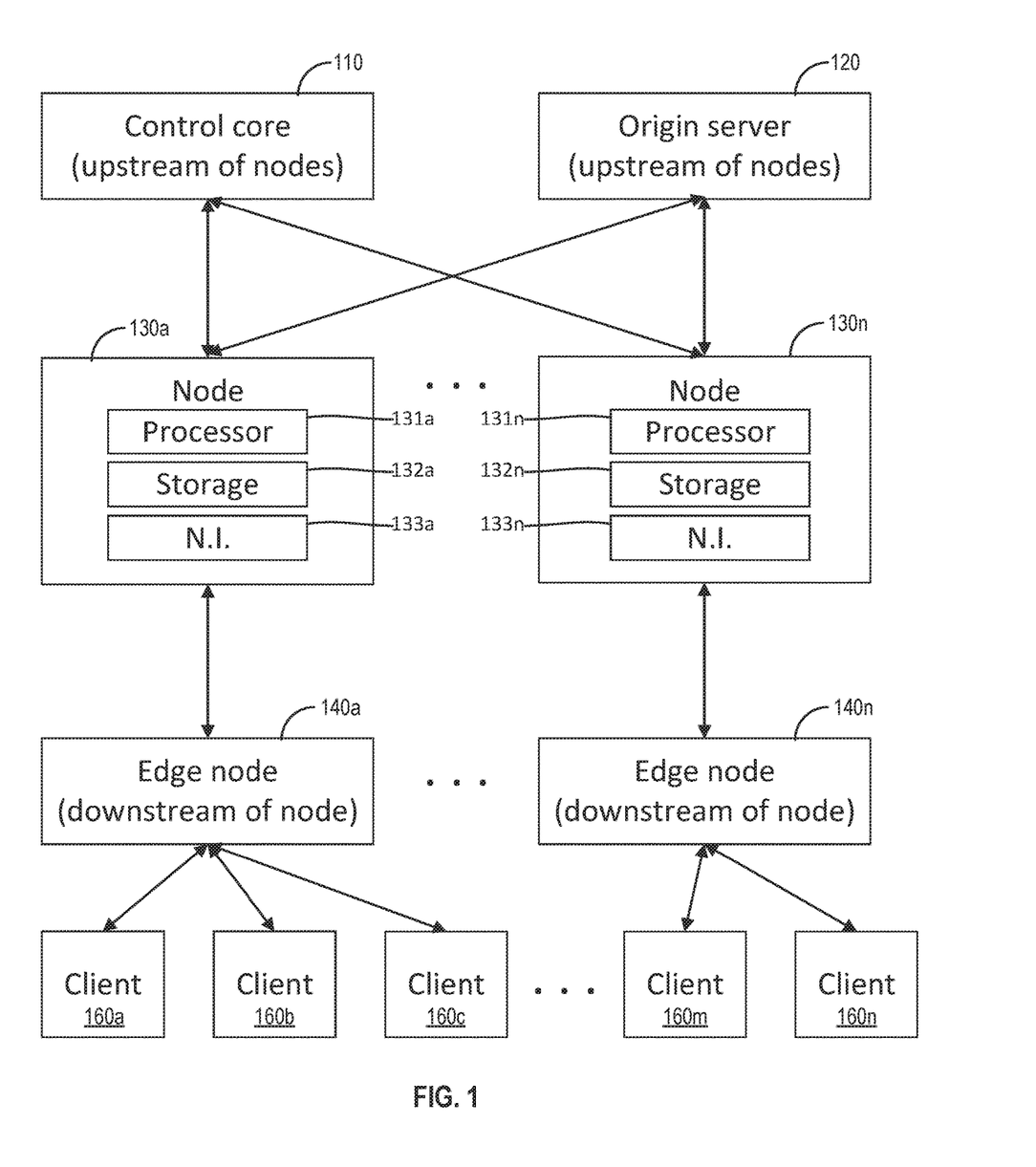
FIG. 1 is a diagram of a content delivery network (CDN) configured to contain a faulty stimulus, according to various embodiments.

FIG. 1 is a diagram of a CDN 100 according to some embodiments. Referring to FIG. 1, the CDN 100 is configured for delivering content items provided by an origin server 120 to various clients 160*a*-160*n* via nodes 130*a* . . . 130*n* (which may be collectively referred to herein as nodes 130) and edge nodes 140*a* . . . 140*n* (which may be collectively referred to herein as nodes 140 or as edge nodes 140). Control core 110 distributes stimuli to nodes 130 and edge nodes 140, e.g., commands for such nodes to take action or change configuration. A user of a respective one of the clients 160*a*-160*n* may request and receive the content items provided by the origin server 120 via node(s) 130, 140. In some embodiments, each of the clients 160*a*-160*n* can be a desktop computer, mainframe computer, laptop computer, pad device, smart phone device, or the like, configured with hardware and software to perform operations described herein. For example, each of the clients 160*a*-160*n* includes a network device and a user interface. The network device is configured to connect the clients 160*a*-160*n* to a node (e.g., an edge node 140) of the CDN 100. The user interface is configured for outputting (e.g., displaying media content, games, information, and so on) based on the content items as well as receiving user input from the users.

In some examples, the CDN 100 is configured for delivering and distributing the content items originating from the origin server 120 to the clients 160*a*-160*n*. For example, the CDN 100 includes nodes 130, 140, where the origin server 120 is connected directly or indirectly to some or all of nodes 130a . . . 130n, and each of nodes 130a . . . 130n is connected directly or indirectly to at least one corresponding edge node 140a . . . 140n. The origin server 120, the nodes 130, the edge nodes 140, and other nodes in the CDN 100 not shown can be located in different locations, thus forming the geographically distributed CDN 100. While there can be additional nodes between the nodes 130 and the origin server 120, the nodes 130 can be directly connected to the origin server 120, or the nodes 130 can be the origin server 120. In some configurations, one or both of nodes 130 and edge nodes 140 may be configured to implement the present functionality for containing a faulty stimulus that is distributed by control core 110.

The content items of the origin server 120 can be replicated and cached in multiple locations (e.g., multiple nodes) throughout the CDN 100, including in the nodes 130, 140 and other nodes (not shown). As used herein, the node 130 refers to any node in the CDN 100 (between the origin server 120 and the edge node 140) that stores copies of content items provided by the origin server 120. The origin server 120 refers to the source of the content items. The origin server 120 can belong to a customer (e.g., a content owner, content publisher, or a subscriber of the system 100) of the CDN 100 such that the customer pays a fee for using the CDN 100 to deliver the content items. Examples of content items include, but are not limited to, webpages and web objects (e.g., text, graphics, scripts, and the like), downloadable objects (e.g., media files, software, documents, and the like), live streaming media, on-demand streaming media, social networks, and applications (e.g., online multiplayer games, dating applications, e-commerce applications, portals, and the like), and so on.

The nodes 130, 140, and any other nodes (not shown) between the edge nodes 140 and the origin server 120 form a "backbone" of the CDN 100, providing a path from the origin server 120 to the clients 160a-160n. The nodes 130 are upstream with respect to the edge nodes 140 given that the nodes 130 are between respective edge nodes 140 and the origin server 120 as well as control core 110, the edge nodes 140 are downstream of nodes 130, and nodes 130 are downstream of origin server 120 and control core 110. In some embodiments, the edge node 140 is referred to as an "edge node" given the proximity of the edge node 140 to the clients 160a-160n.

In some embodiments, the node 130 (and any other nodes between the node 130 and the origin server 120 not shown) is referred to as an "intermediate node." The intermediate nodes link the edge nodes 140 to the origin server 120 and to control core 110 via various network links or "hops." The intermediate nodes can provide the content items (and updates thereof) to the edge nodes, and also can distribute stimuli to the edge nodes. That is, the origin server 120 can provide the content items (and updates thereof) to the edge node 140 through the node 130, if the edge node 140 does not currently cache a copy of the content items respectively requested by the clients 160a-160n. Additionally, control core 110 can provide stimuli to the edge nodes 140 through the nodes 130.

Each link between one of the clients 160a-160n and the edge node 140 corresponds to a suitable network connection for exchanging data, such as content items. In addition, each link between the nodes/servers 130, 140, . . . , 110, and 120 represents a suitable network connection for exchanging data such as content items or stimuli. A network connection is structured to permit the exchange of content items and stimuli, e.g., data, values, instructions, messages, and the like, among the clients 160a-160n, the nodes 130, 140, and so on, and the control core 110 and origin server 120 in the manner shown. The network connection can be any suitable Local Area Network (LAN) or Wide Area Network (WAN) connection. For example, each network link can be supported by Frequency Division Multiple Access (FDMA), Time Division Multiple Access (TDMA), Synchronous Optical Network (SONET), Dense Wavelength Division Multiplexing (DWDM), Optical Transport Network (OTN), Code Division Multiple Access (CDMA) (particularly, Evolution-Data Optimized (EVDO)), Universal Mobile Telecommunications Systems (UMTS) (particularly, Time Division Synchronous CDMA (TD-SCDMA or TDS) Wideband Code Division Multiple Access (WCDMA), Long Term Evolution (LTE), evolved Multimedia Broadcast Multicast Services (eMBMS), High-Speed Downlink Packet Access (HSDPA), and the like), Universal Terrestrial Radio Access (UTRA), Global System for Mobile Communications (GSM), Code Division Multiple Access 1× Radio Transmission Technology (1×), General Packet Radio Service (GPRS), Personal Communications Service (PCS), 802.11X, ZigBee, Bluetooth, Wi-Fi, any suitable wired network, combination thereof, and/or the like.

In the example configuration illustrated in FIG. 1, each of nodes 130a . . . 130n is configured for containing a faulty stimulus that may be distributed by control core 110. For example, each of nodes 130a . . . 130n is a computer system that includes a respective processor 131a . . . 131n, storage 132a . . . 132n, and network interface (N.I.) 133a . . . 133n. Control core 110 may distribute stimuli to nodes 130a . . . 130n. Examples of stimuli that may be distributed by control core 110 include, but are not limited to, commands for downstream nodes (such as one or both of nodes 130a . . . 130n and nodes 140a . . . 140n) to take an action or to change configuration. Examples of commands to take action that control core 110 may provide as stimuli include, but are not limited to, invalidate customer content, or download a new control resource. Examples of commands to change configuration that control core 110 may provide as stimuli include, but are not limited to, change configuration for a particular customer, or change a configuration setting. At least one of the stimuli distributed by control core 110 to nodes 130a . . . 130n may be faulty, e.g., may contain an error that would cause a software application running on a node in CDN 100 (e.g., one or more of nodes 130, 140) to crash. The faultiness of that stimulus may be inadvertent, e.g., may include an inadvertent command error that would cause the software application to crash. Examples of inadvertent command errors include, but are not limited to, coding errors leading to unrecoverable processing faults, which may be most likely in failure recovery code paths, or attempts to allocate more resources (e.g., memory) than are available. However, it will be appreciated that the faultiness of that stimulus may be intentional, e.g., may include an intentional command error, introduced by a malicious entity, that would cause the software application to crash.

Processors 131a . . . 131n can be implemented with a general-purpose processor, an Application Specific Integrated Circuit (ASIC), one or more Field Programmable Gate Arrays (FPGAs), a Digital Signal Processor (DSP), a group of processing components, or other suitable electronic processing components. Processors 131a . . . 131n respectively may include or may be coupled to memory (not specifically illustrated), e.g., a Random Access Memory (RAM), Read-Only Memory (ROM), Non-Volatile RAM (NVRAM), flash memory, hard disk storage, or another suitable data storage unit, which stores data and/or computer code for facilitating the various processes executed by the processors 131a . . . 131n. The memory may be or include tangible, non-transient volatile memory or non-volatile memory. Accordingly, the memory includes database components, object code components, script components, or any other type of information structure for supporting the various functions described herein. Each storage 132a . . . 132n can include a mass storage device, such as a hard disk drive or solid state drive. Network interfaces 133a . . . 133n include any suitable combination of hardware and software to establish communication with clients (e.g., the clients 160a-160n), other nodes in the CDN 100 such as respective edge nodes 140a . . . 140n, control core 110, and origin server 120 as appropriate. In some implementations, the network interfaces 133a . . . 133n includes a cellular transceiver (configured for cellular standards), a local wireless network transceiver (for 802.11X, ZigBee, Bluetooth, Wi-Fi, or the like), a wired network interface, a combination thereof (e.g., both a cellular transceiver and a Bluetooth transceiver), and/or the like.

Processors 131a . . . 131n may be configured to implement operations for containing a faulty stimulus, rather than automatically distributing any and all stimuli (including the faulty stimulus) to other nodes in CDN 100. In examples such as illustrated in FIG. 1, each processor 131a . . . 131n may be configured to cause respective storage 132a . . . 132b to store a suspect list and to automatically add to that list every stimulus that the processor receives directly or indirectly from control core 110, which may include non-faulty stimuli and the faulty stimulus. One non-limiting example of a suspect list is a memory mapped file. Data written to the mapped memory is automatically written to the file, even if the application crashes.

Each processor 131a . . . 131n may be configured to implicitly test the stimuli that are listed in the suspect list by respectively acting upon those stimuli. As used herein, by "acting upon" stimuli it is meant to execute commands set forth by those stimuli. As such, the "testing" of stimuli is implicit—seeing what happens when the processor executes the stimuli—rather than an explicit, stimulus-specific test. For example, if a given stimulus includes a command to take an action, then processor 131a . . . 131n takes that action. Or, for example, if a given stimulus includes a command to change configuration, then processor 131a . . . 131n makes that configuration change. For stimuli that are non-faulty, processor 131a . . . 131n successfully acts upon that stimulus (e.g., successfully takes the action or makes the configuration change), and as such the stimulus is safe to distribute to one or more downstream nodes, e.g., to a respective edge node 140a . . . 140n. Responsive to such successful action of processor 131a . . . 131n upon the non-faulty stimuli, the processor deletes that non-faulty stimulus from the suspect list. Responsive to such deletion, the processor then makes that that non-faulty stimulus available to a downstream node, e.g., to a respective edge node 140a . . . 140n, via a respective network interface 133a . . . 133n. For example, the processor may distribute the non-faulty stimulus to the downstream node by pushing the non-faulty stimulus to that node, or allowing the downstream node to pull the non-faulty stimulus.

In comparison, when the processor 131a . . . 131n implicitly tests the faulty stimulus by acting upon it, that stimulus causes the software application executing that stimulus to crash which leaves the faulty stimulus listed in the suspect list. In this regard, storage device 132a . . . 132n preferably is stable, non-volatile storage that retains items in storage regardless of a crash and restart. Responsive to the crash, the software application restarts. Optionally, but not necessarily, such crash and restart may be performed as part of a computer operating system crash that was caused by executing the stimulus, followed by a computer reboot. Processor 131a . . . 131n is configured to deem the faulty stimulus as being faulty based upon it still being listed in the suspect list after restarting. As such, the absence of a stimulus from the suspect list means that the stimulus was successfully implicitly tested by the software application, deemed not to be faulty, and distributed to downstream node(s), whereas the presence of a stimulus within the suspect following a crash means that the stimulus should be deemed to be faulty and therefore not acted upon again by processor 131a . . . 131n or distributed to downstream node(s).

Deeming of the faulty stimulus as being faulty may inhibit further distribution of, or action upon, the faulty stimulus within CDN 100. Illustratively, processor 131a . . . 131n further can be configured to report the deemed faulty stimulus to an upstream computer. For example, processor 131a . . . 131n can be configured to automatically transmit (directly or indirectly) to control core 110 information that identifies the deemed faulty stimulus. Control core 110 may add the faulty stimulus to a "blacklist" of stimuli that should not be distributed within CDN 100, and should be investigated, corrected, or deleted as appropriate. Regardless of the particular format in which the faulty stimulus is deemed to be faulty, processor 131a . . . 131n may be configured not to act again upon the faulty stimulus based upon the faulty stimulus being deemed faulty, or may be configured not to make the faulty stimulus available to the downstream node based upon the faulty stimulus being deemed faulty. For example, processor 131a . . . 131n may report the stimulus deemed to be faulty by logging a message in the system logs (which messages can be configured by a general service to cause an alarm to be raised), and a command interface may allow retrieval of the suspect list, e.g., via an HTTP transaction. The report itself may be in plaintext or may be structured in some way, e.g., in JSON, YAML, or the like. The faulty stimulus may remain in the suspect list unless and until operator intervention removes it. For example, if a stimulus is in the suspect list upon application restart, that stimulus will not be acted upon and therefore the only way that the stimulus may be removed is by operator intervention.

Note that in some circumstances, the crash also may leave a non-faulty stimulus listed in the suspect list. For example, as noted above, control core 110 may distribute a plurality of stimuli to each of nodes 130a . . . 130n. Although each of such stimuli is automatically listed in the suspect list and removed following successful implicit testing, processor 131a . . . 131n may not necessarily implicitly test and then remove all listed stimuli immediately upon receipt but instead may accumulate multiple stimuli in the suspect list prior to being able to implicitly test such stimuli. As such, at the particular moment when the software application of node 130a . . . 130n acts upon the faulty stimulus and therefore crashes, one or more non-faulty stimuli may be listed in the suspect list that have simply not been implicitly tested yet. Processor 131a . . . 131n may be configured to deem such one or more non-faulty stimuli as being faulty based upon their still being in listed in the suspect list after the software application restarts. This option may result in non-faulty stimuli not being distributed or acted upon by nodes 130, 140, which may result in CDN 100 having somewhat reduced capability compared to if such non-faulty stimuli were distributed and acted upon. Nonetheless, it may be better to operate with such reduced capability because the resulting containment of faulty stimuli may avert what otherwise may be catastrophic failure of one or more nodes within CDN 100.

Furthermore, note that edge nodes 140a . . . 140n may be configured similarly as nodes 130a . . . 130n with regards to fault containment, e.g., respectively may include a processor configured similarly as processor 131a . . . 131n and storage device configured similarly as storage 132a . . . 132n to store a suspect list. Additionally, or alternatively, any other node(s) in CDN 100 may be configured similarly as nodes 130a . . . 130n with regards to fault containment, e.g., respectively may include a processor configured similarly as processor 131a . . . 131n and storage device configured similarly as storage 132a . . . 132n to store a suspect list. In this regard, if multiple nodes crash, e.g., if each of nodes 130a . . . 130n receives and acts upon a faulty stimulus, and therefore crashes, the faulty stimulus will be listed in the suspect list of each of those nodes. The suspect lists of those nodes can be compared to one another, e.g., by an upstream computer which receives reports of the faulty stimulus from each of those nodes. The faulty stimulus may be identified based upon such comparison, e.g., based upon that stimulus's presence in each of the suspect lists. If the crashed nodes also happen to have deemed the same non-faulty stimuli to be faulty and therefore reported them as well, then further investigation may be appropriate to determine which of the stimuli were actually faulty. Any non-faulty stimuli may be removed from the suspect list, e.g., after determining that such stimuli did not cause the crash.

Figure 2:
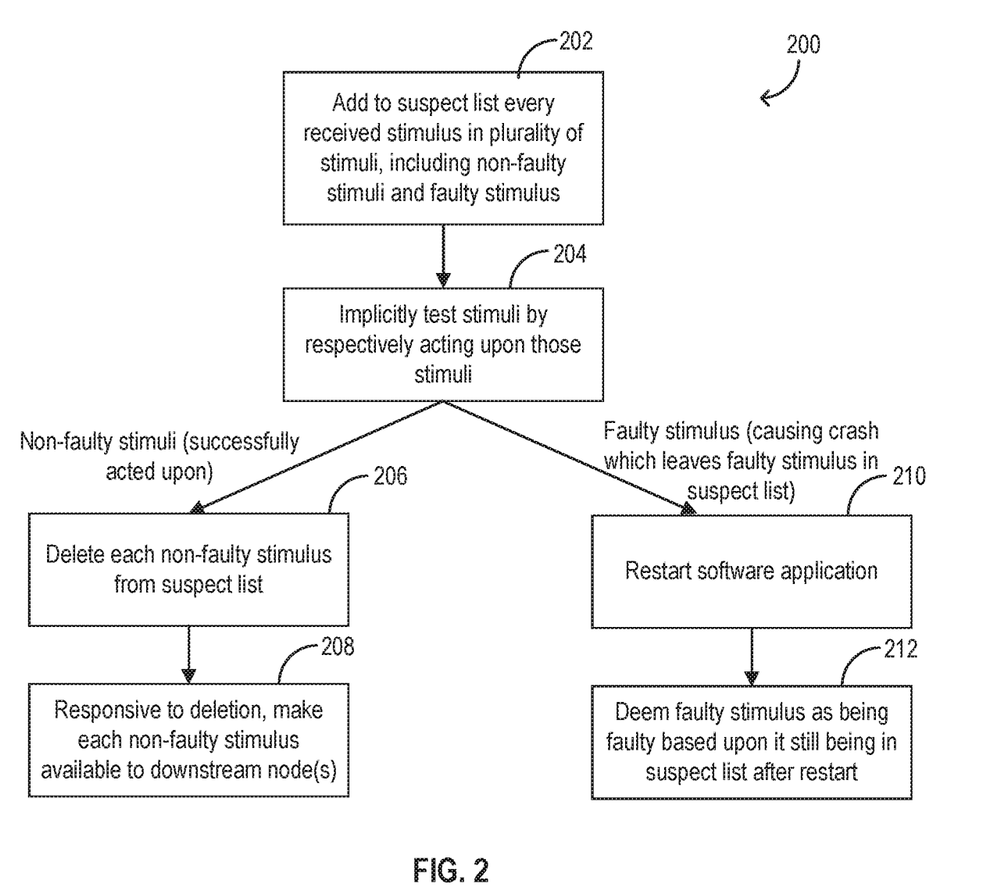
FIG. 2 is a flow diagram illustrating a method for containing a faulty stimulus in a CDN, according to various embodiments.

Any suitable one or more computers or processing circuits within CDN 100 or a node therein, such as described with reference to FIG. 1, or any other suitable computer or processing circuit, may be configured for use in a method for containing a faulty stimulus in a manner such as provided herein. For example, FIG. 2 illustrates a flow of operations in an exemplary method 200 for containing a faulty stimulus in a CDN, according to various configurations provided herein. Method 200 described with reference to FIG. 2 may be implemented by any suitable computer comprising a processor, a storage device, and a network interface.

Method 200 illustrated in FIG. 2 may include adding to a suspect list every stimulus in a received plurality of stimuli including non-faulty stimuli and the faulty stimulus (operation 202). For example, in a manner such as described with reference to FIG. 1, a computer (e.g., node 130a) may receive stimuli from an upstream computer (e.g., control core 110) and automatically add such stimuli to a suspect list that is stored in non-volatile storage (e.g., storage 132a). Method 200 illustrated in FIG. 2 also may include implicitly testing the stimuli by respectively acting upon those stimuli (operation 204). For example, in a manner such as described with reference to FIG. 1, that computer's processor (e.g., processor 131a) may execute commands set forth by those stimuli. Method 200 illustrated in FIG. 2 also may include, responsive to successfully acting upon each of the non-faulty stimuli, deleting that non-faulty stimulus from the suspect list (operation 206). Method 200 illustrated in FIG. 2 also may include, responsive to the deletion, making that non-faulty stimulus available to a downstream node (operation 208). For example, if the stimuli do not crash the software application, then such stimuli are removed from the suspect list, deemed to be safe, and further distributed (e.g., to one or more nodes 140 via a push or pull). Method 200 illustrated in FIG. 2 also may include, responsive to a crash caused by acting upon the faulty stimulus, restarting the software application subsequent to the crashing (operation 210); and deeming the faulty stimulus as being faulty based upon it still being listed in the suspect list after the restarting (operation 212). For example, listing of a stimulus or stimuli in the suspect list after the restarting means that one or more of such stimulus or stimuli may be faulty, and all of such stimulus or stimuli therefore are deemed faulty even though non-faulty stimulus may be present. In various optional configurations, method 200 may include reporting the deemed faulty stimulus to an upstream computer (e.g., to control core 110); the computer does not act again upon the faulty stimulus based upon the faulty stimulus being deemed faulty; or the computer makes the faulty stimulus unavailable to the downstream node based upon the faulty stimulus being deemed faulty, e.g., in a manner such as described with reference to FIG. 1.

Figure 3:
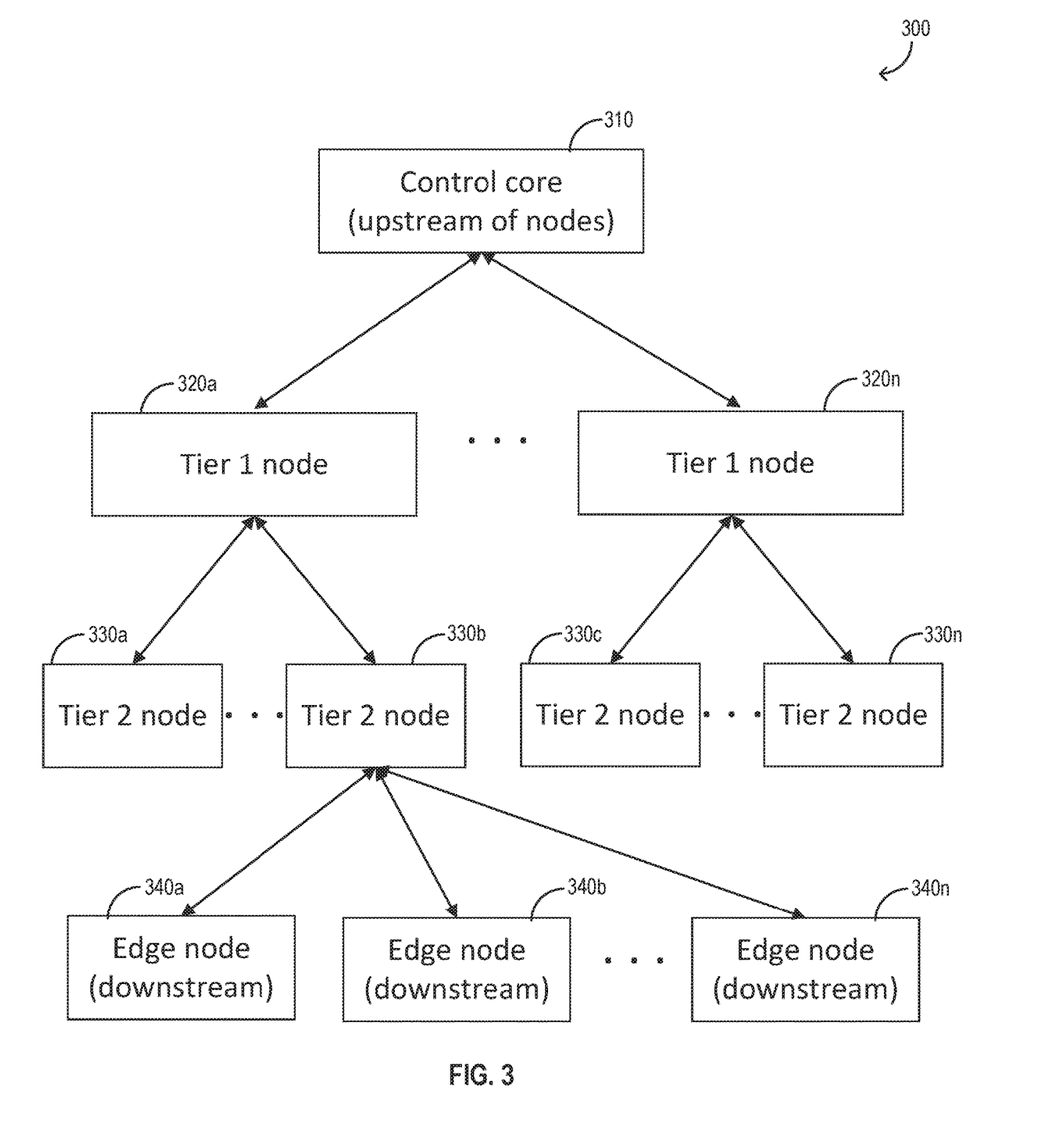
FIG. 3 is a diagram of another CDN configured to contain a faulty stimulus, according to various embodiments.

In addition, or as an alternative, to containing faulty stimuli based upon their presence in in the suspect list after restart, the CDN itself may be structured in such a manner as to contain faulty stimuli. For example, FIG. 3 is a diagram of another CDN 300 continued to contain a faulty stimulus, according to various embodiments. CDN 300 may include control node 310 which may be configured similarly to control node 110; an origin server (not specifically illustrated) which may be configured similarly to origin server 120; edge nodes 340a . . . 340n which may be configured similarly to edge nodes 140a . . . 140n and coupled to clients (not specifically illustrated) which may be configured similarly to clients 160a . . . 160n. CDN 300 further includes a plurality of nodes disposed between the control core 310 and edge nodes 340a . . . 340n. In the example illustrated in FIG. 3, CDN 300 includes hierarchically arranged tiers of nodes disposed between control core 310 and edge nodes 340a . . . 340n, e.g., tier 1 nodes 320a . . . 320n which are directly coupled to control core 310, and which is each directly coupled to a plurality of tier 2 nodes 330a . . . 330n. Each of tier 2 nodes 330a . . . 330n may be coupled to a plurality of edge nodes 340a . . . 340n, either directly or indirectly through a plurality of additional nodes (not specifically illustrated) each of which is coupled directly or indirectly to a plurality edge nodes 340a-340n.

A subset or all of at least the intermediate nodes in CDN 300, e.g., some or all of tier 1 nodes 320a . . . 320n, and in addition or alternatively some or all of tier 2 nodes 330a . . . 330n, may be configured to as to contain a faulty stimulus from control core 310. For example, each of such nodes may include a processor and a network interface (not specifically illustrated, but configured similarly as described with reference to FIG. 1). The processor may be configured to implement operations that include implicitly testing a received plurality of stimuli, including non-faulty stimuli and the faulty stimuli, by respectively acting upon the stimuli in a manner similar to that described with reference to FIGS. 1-2. Responsive to successfully acting upon the non-faulty stimuli (e.g., executing those stimuli by a software application without crashing) the processor may make available, via the network interface, those stimuli to the plurality of downstream nodes. For example, the processor of a tier 1 node 320a . . . 320n may make non-faulty stimuli available (e.g., via push or pull) to the tier 2 nodes 330a . . . 330n to which that tier 1 node is coupled, responsive to that tier 1 node having successfully acted upon that non-faulty stimulus. As another example, the processor of a tier 2 node 330a . . . 330n may make non-faulty stimuli available (e.g., via push or pull) to the edge nodes 340a . . . 340n to which that tier 2 node is coupled, responsive to that tier 2 node having successfully acted upon that non-faulty stimulus. In comparison, responsive to a crash caused by acting upon the faulty stimulus, the faulty stimulus may be made unavailable to the plurality of downstream nodes. For example, the crashing of the software application running on any given one of the tier 1 nodes 320*a* . . . 320*n* or tier 2 nodes 330*a* . . . 330*n* inhibits that node from distributing (e.g., as a push or pull) the faulty stimulus to any of the nodes to which it is attached. Instead, those nodes continue operating normally because they do not receive and therefore do not act upon the faulty stimulus.

Optionally, each of the downstream nodes also is configured to implement the operations of the upstream tier 1 node or tier 2 node to which it is attached. For example, both the tier 1 nodes and tier 2 nodes may be configured to implicitly test stimuli before distributing such stimuli downstream. In some examples, at least one of the downstream nodes uses a different software application version than does the processor of the upstream node. As such, the stimuli may be implicitly tested by different software application versions, which may respond differently to the stimuli, before ultimately being distributed to the edge nodes.

Figure 4:
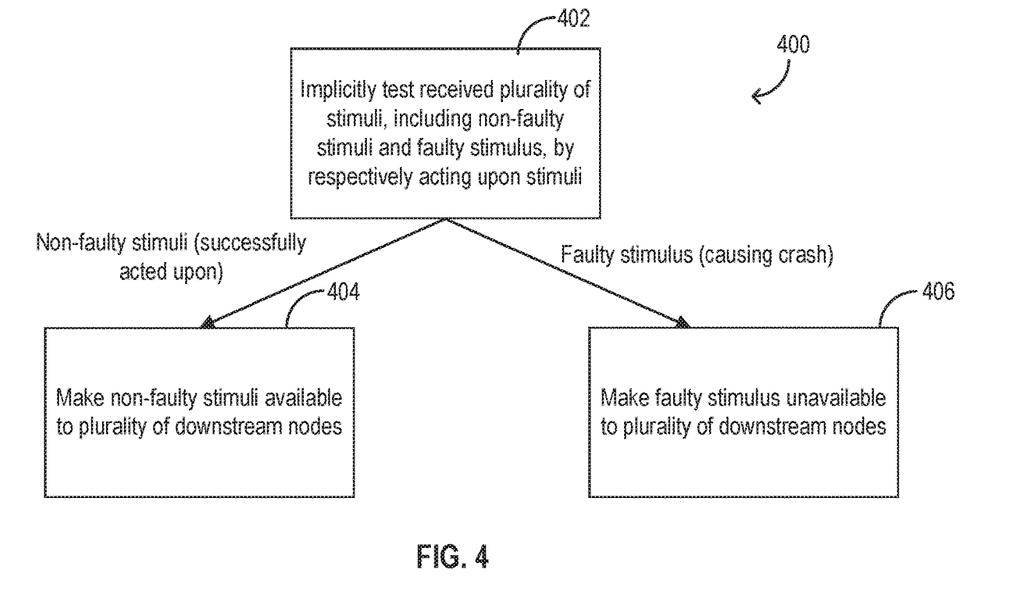
FIG. 4 is a flow diagram illustrating another method for containing a faulty stimulus in a CDN, according to various embodiments.

FIG. 4 is a flow diagram illustrating another method 400 for containing a faulty stimulus in a CDN. Method 400 illustrated in FIG. 4 includes implicitly testing a received plurality of stimuli, including non-faulty stimuli and the faulty stimulus, by respectively acting upon those stimuli (operation 402). For example, the processor of any of the tier 1 nodes 330*a* . . . 330*n* or tier 2 nodes 340*a* . . . 340*n* may act upon received stimuli in a manner similar to that described with reference to FIGS. 1-3. As an additional option, that processor may add received stimuli to a suspect list in a manner such as described with reference to FIGS. 1-2. Method 400 illustrated in FIG. 4 includes, responsive to acting upon the non-faulty stimuli, making those non-faulty stimuli available to a plurality of downstream nodes (operation 404). For example, based upon the processor of any of the tier 1 nodes 330*a* . . . 330*n* or tier 2 nodes 340*a* . . . 340*n* having successfully acted upon the stimuli (without crashing), such stimuli are deemed to be safe for distribution to downstream nodes. Method 400 illustrated in FIG. 4 includes, responsive to a crash caused by acting upon the faulty stimulus, making the faulty stimulus unavailable to the plurality of downstream nodes. For example, based upon the faulty stimulus causing the software application of tier 1 node 330*a* . . . 330*n* or tier 2 node 340*a* . . . 340*n* to crash, such stimulus is not safe for distribution to downstream nodes and the crash makes the stimulus unavailable (e.g., as a push or pull) to the downstream nodes. In a manner such as noted above with reference to FIG. 3, each of the downstream nodes optionally also is configured to implement the method, or at least one of the downstream nodes has a different software application version than does the computer.

Accordingly, in some examples herein, a node's acting upon a stimulus may be considered to provide a general and implicit test of that stimulus, in that the survival of that node means that the stimulus is safe, while crashing of the node means that the stimulus is not safe and inhibits further distribution of that stimulus. Note that before being distributed to node(s), the stimulus may well go through a number of specific tests before being acted upon, and may be rejected for any of a variety of reasons, and such specific tests are compatible with the present systems and methods. However, for a sufficiently faulty stimulus, testing that stimulus may cause a software crash. For example, the crash may occur in rarely (or heretofore never) used code paths which are taken in response to attempting to reject a stimulus. Alternatively, a stimulus which passed specific tests nonetheless may cause a software crash, for example because the specific tests do not detect that stimulus's faultiness and so it is distributed for normal processing.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices, such as one or more primary storage devices or secondary storage devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, ASICs, FPGAs, DSPs, or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the system, for example the one or more processors may be a remote processor (e.g., a cloud based processor). Alternatively or additionally, the one or more processors may be internal and/or local to the system. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the embodiments might include a general purpose computer, special purpose computer, or special purpose processing machine including a processing unit, a system memory device, and a system bus that couples various system components including the system memory device to the processing unit. The system memory may be or include the primary storage device and/or the secondary storage device. One or more of the system memory, primary storage device, and secondary storage device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and embodiment of the embodiments without departing from the scope of the present disclosure as expressed in the appended claims.

What is claimed is:

1. A computer-implemented method for containing a faulty stimulus, the method comprising:
adding to a suspect list every stimulus in a received plurality of stimuli including non-faulty stimuli and the faulty stimulus;
implicitly testing the stimuli by respectively acting upon those stimuli by a software application;
responsive to successfully acting upon each of the non-faulty stimuli by the software application:
deleting that non-faulty stimulus from the suspect list; and
responsive to the deleting, making that non-faulty stimulus available to a downstream node; and
responsive to a crash of the software application caused by acting upon the faulty stimulus:
restarting the software application subsequent to the crashing; and
deeming the faulty stimulus as being faulty based upon it still being listed in the suspect list after the restarting.

2. The method of claim 1, further comprising reporting the deemed faulty stimulus to an upstream computer.

3. The method of claim 1, wherein the computer makes the faulty stimulus unavailable to the downstream node based upon the faulty stimulus being deemed faulty.

4. The method of claim 1, wherein the crash also leaves a non-faulty stimulus listed in the suspect list, and wherein that non-faulty stimulus is deemed as being faulty based upon it still being in listed in the suspect list after the restarting.

5. The method of claim 1, wherein stimuli of the plurality of stimuli independently include commands for the downstream node to take an action or to change configuration.

6. The method of claim 1, wherein the storage device comprises a mass storage device.

7. A computer system comprising a processor, a storage device, and a network interface, the processor being configured to implement operations comprising:
adding to a suspect list stored in the storage device, by the processor, every stimulus in a received plurality of stimuli including non-faulty stimuli and the faulty stimulus;
implicitly testing, by a software application running on the processor, the stimuli by respectively acting upon those stimuli;
responsive to successfully acting upon each of the non-faulty stimuli:
deleting, by the processor, that non-faulty stimulus from the suspect list; and responsive to the deleting, making available, by the processor via the network interface, that non-faulty stimulus to a downstream node; and responsive to a crash of the software application caused by acting upon the faulty stimulus:
   restarting the software application subsequent to the crashing; and
   deeming, by the processor, the faulty stimulus as being faulty based upon it still being listed in the suspect list after the restarting.

8. The computer system of claim 7, wherein the processor further is configured to report the deemed faulty stimulus to an upstream computer.

9. The computer system of claim 7, wherein the processor further is configured to make the faulty stimulus unavailable to the downstream node based upon the faulty stimulus being deemed faulty.

10. The computer system of claim 7, wherein the crashing also leaves a non-faulty stimulus listed in the suspect list, and wherein the processor further is configured to deem that non-faulty stimulus as being faulty based upon it still being in listed in the suspect list after the restarting.

11. The computer system of claim 7, wherein stimuli of the plurality of stimuli independently include commands for a downstream node to take an action or to change configuration.

12. The computer system of claim 7, wherein the storage device comprises a mass storage device.

13. A computer-implemented method for containing a faulty stimulus, the method comprising:
   implicitly testing a received plurality of stimuli, including non-faulty stimuli and the faulty stimulus, by respectively acting upon those stimuli by a software application;
   responsive to successfully acting upon the non-faulty stimuli, making those non-faulty stimuli available to a plurality of downstream nodes; and
   responsive to a crash of the software application caused by acting upon the faulty stimulus, making the faulty stimulus unavailable to the plurality of downstream nodes.

14. The method of claim 13, wherein each of the downstream nodes also is configured to implement the method.

15. The method of claim 14, wherein at least one of the downstream nodes has a different software application version than does the computer.

16. A computer system comprising a processor and a network interface, the processor being configured to implement operations comprising:
   implicitly testing, by the processor, a received plurality of stimuli, including non-faulty stimuli and the faulty stimuli, by respectively acting upon the stimuli by a software application;
   responsive to successfully acting upon the non-faulty stimuli, making available, by the processor via the network interface, those stimuli to the plurality of downstream nodes; and
   responsive to a crash of the software application caused by acting upon the faulty stimulus, making the faulty stimulus unavailable to the plurality of downstream nodes.

17. The system of claim 16, wherein each of the downstream nodes also is configured to implement the operations.

18. The system of claim 17, wherein at least one of the downstream nodes uses a different software application version than does the processor.

* * * * *